United States Patent
Lindoff et al.

(10) Patent No.: US 8,594,694 B2
(45) Date of Patent: Nov. 26, 2013

(54) ALLEVIATING MOBILE DEVICE OVERLOAD CONDITIONS IN A MOBILE COMMUNICATION SYSTEM

(75) Inventors: Bengt Lindoff, Bjärred (SE); Bo Bernhardsson, Lund (SE); Johan Nilsson, Höllviken (SE); Torgny Palenius, Barsebäck (SE); Andreas Wilde, Schriesheim (DE); Werner Anzill, Poecking (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/301,329

(22) Filed: Nov. 21, 2011

(65) Prior Publication Data
US 2012/0064909 A1  Mar. 15, 2012

Related U.S. Application Data

(62) Division of application No. 12/239,346, filed on Sep. 26, 2008, now Pat. No. 8,086,229.

(60) Provisional application No. 61/031,162, filed on Feb. 25, 2008, provisional application No. 61/031,166, filed on Feb. 25, 2008.

(51) Int. Cl.
*H04W 72/00* (2009.01)
(52) U.S. Cl.
USPC ............... 455/453; 455/452.1; 455/452.2
(58) Field of Classification Search
USPC .................... 455/452.1, 452.2, 453
See application file for complete search history.

(56) References Cited

U.S. PATENT DOCUMENTS

| | | | |
|---|---|---|---|
| 4,870,698 | A | 9/1989 | Katsuyama et al. |
| 6,169,884 | B1 | 1/2001 | Funk |
| 6,574,209 | B1 | 6/2003 | Kosaka |
| 6,799,058 | B2 | 9/2004 | An |

(Continued)

FOREIGN PATENT DOCUMENTS

| | | |
|---|---|---|
| EP | 1 143 627 A1 | 10/2001 |
| EP | 1 513 356 A2 | 3/2005 |

(Continued)

OTHER PUBLICATIONS

PCT International Search Report, mailed Aug. 3, 2009, in connection with International Application No. PCT/EP2009/052074.

(Continued)

*Primary Examiner* — Barry Taylor
(74) *Attorney, Agent, or Firm* — Potomac Patent Group PLLC; Kenneth B. Leffler

(57) ABSTRACT

A user equipment (UE) in a mobile communications system is operated in a manner that alleviates or avoids an overload condition in the UE. This involves operating a receiver of the UE to receive one or more data blocks via a channel. In response to a user equipment overload condition being detected, a channel quality indicator (CQI) value is reported to a serving base station, wherein the reported CQI value represents a channel quality that is lower than an actual quality of the channel. The UE is then operated in a manner that is consistent with the reported CQI value. UE overload conditions include overheating, and an inability to process received data blocks at the rate at which they are being received.

8 Claims, 8 Drawing Sheets

(56) References Cited

U.S. PATENT DOCUMENTS

| | | |
|---|---|---|
| 6,934,267 B1 | 8/2005 | Mannerstrale |
| 7,023,824 B2 | 4/2006 | Khullar |
| 7,079,856 B2 | 7/2006 | Khan |
| 7,130,937 B2 | 10/2006 | Hwang et al. |
| 7,206,567 B2 | 4/2007 | Jin et al. |
| 7,342,955 B2 | 3/2008 | Forest et al. |
| 2004/0160901 A1 | 8/2004 | Raith |
| 2004/0203973 A1 | 10/2004 | Khan |
| 2005/0143084 A1* | 6/2005 | Cheng et al. ............... 455/452.2 |
| 2005/0288014 A1 | 12/2005 | Rajkotia et al. |
| 2006/0092869 A1* | 5/2006 | Herrmann .................... 370/314 |
| 2007/0173249 A1 | 7/2007 | Ogoshi |
| 2008/0046132 A1 | 2/2008 | Dalsgaard et al. |
| 2009/0161545 A1* | 6/2009 | Ho et al. ....................... 370/235 |
| 2009/0204867 A1* | 8/2009 | Ho ................................ 714/749 |

FOREIGN PATENT DOCUMENTS

| | | |
|---|---|---|
| EP | 1131906 B1 | 5/2005 |
| GB | 2386507 A | 9/2003 |
| WO | 00/49760 A1 | 8/2000 |
| WO | 02/069520 A1 | 9/2002 |
| WO | 2006/065181 A1 | 6/2006 |

OTHER PUBLICATIONS

Article 94(3) EP Communication, dated Aug. 20, 2012, in connection with European Patent Application No. 09 713 919.0-1237.

* cited by examiner

ALLEVIATING MOBILE DEVICE OVERLOAD CONDITIONS IN A MOBILE COMMUNICATION SYSTEM

CROSS REFERENCE TO RELATED APPLICATIONS

This application is a divisional of U.S. patent application Ser. No. 12/239,346, filed Sep. 26, 2008, now U.S. Pat. No. 8,086,229 which claims the benefit of U.S. Provisional Application 61/031,162, filed Feb. 25, 2008; and of U.S. Provisional Application No. 61/031,166, filed Feb. 25, 2008, which applications are hereby incorporated herein by reference in their entireties.

BACKGROUND

The present invention relates to mobile communications, and more particularly to methods and apparatuses for operating a mobile device to avoid or alleviate overload conditions in a mobile communication system.

The forthcoming Evolved-Universal Terrestrial Radio Access Network (E-UTRAN) Long Term Evolution (LTE) technology, as defined by 3GPP TR 36.201, "Evolved Universal Terrestrial Radio Access (E-UTRA); Long Term Evolution (LTE) physical layer; General description" will be able to operate over a very wide span of operating bandwidths (e.g., 1.4 MHz to 20 MHz) and also carrier frequencies. Furthermore E-UTRAN systems will be capable of operating within a large range of distances, from microcells (i.e., cells served by low power base stations that cover a limited area, such as a shopping center or other building accessible to the public) up to macrocells having a range that extends up to 100 km. In order to handle the different radio conditions that may occur in the different applications, multiple access in the downlink (i.e., the communications link from the base station to user equipment—"UE") is achieved by Orthogonal Frequency Division Multiple Access (OFDMA) technology because it is a radio access technology that can adapt very well to different propagation conditions. In OFDMA, the available data stream is portioned out into a number of narrowband subcarriers that are transmitted in parallel. Because each subcarrier is narrowband it only experiences flat-fading. This makes it very easy to demodulate each subcarrier at the receiver.

Data rates over 300 Mb/s will be supported for the largest bandwidth, and such data rates will be possible by using a Multiple-Input-Multiple Output (MIMO) scheme in the down-link.

The possibility of higher data rates in combination with other requirements for more and more functionality within smaller and smaller mobile devices increases the likelihood of high power consumption in those devices and this, in turn, makes the possibility of severe heating problems ever more likely. Heating increases the risk for damage of the circuits in the mobile device. Thus, there is a need to reduce the risk of overheating a mobile device.

Even if a circuit has not yet reached damaging levels of temperature, its correct operation is jeopardized as it approaches such temperatures. The temperature level at which this happens depends on the circuit and bus clocking speed and battery voltage. Hence, there is an intricate dependency between allowable temperature, battery voltage, and clock speeds.

There are other problems associated with the higher data rates in modern mobile communication systems. The high peak data rates allow a system to exploit system capacity gains by appropriate scheduling of the different users. This means there will be a large difference between peak and average data rates for individual users. In some cases, this can lead to an inability of the user equipment to process and buffer all data received in the downlink (i.e., the communication link in the direction from a serving base station to the user equipment).

As to the problem of user equipment being unable to handle a peak downlink data rate, conventional solutions involve scheduling only limited peak data rates to the user equipment. Alternatively, systems may rely entirely on data retransmissions in those instances in which the user equipment was not able to process all received data (e.g., in case of buffer overflow, exceeding signal processing power, or other factors limiting the capability of the user equipment to process instantaneous data rates). But relying on retransmissions after an overload has occurred can give rise to loss of timing in the user equipment's real time processes, which in turn creates a risk of the user equipment going out-of-synchronization and dropping an existing call.

Accordingly, there are a number of user equipment overload conditions (e.g., temperature overload, buffer overflow, signal processing power overload) associated with the higher data rates of modern mobile communications systems. It is therefore desirable to provide methods and apparatuses that handle these problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that control operation of a user equipment in a mobile communications system. This operation includes operating a receiver of the user equipment to receive one or more data blocks via a channel. In response to a user equipment overload condition being detected, a channel quality indicator (CQI) value is reported to a serving base station, wherein the reported CQI value represents a channel quality that is lower than an actual quality of the channel. The user equipment is then operated in a manner that is consistent with the reported CQI value.

In an aspect of some embodiments, operation of the user equipment involves sending negative acknowledgements (NAKs) to the serving base station at a rate that is consistent with operation by means of a channel having a quality that corresponds to the reported CQI value, including sending one or more NAKs in response to acceptable reception of one or more data blocks. In some of these embodiments, sending NAKs to the serving base station at the rate that is consistent with operation by means of the channel having the quality that corresponds to the reported CQI value is further performed in a manner such that the NAKs are distributed over time in a way that emulates a distribution of NAKs that corresponds to the channel having the quality that corresponds to the reported CQI value. For example, the distribution of sent NAKs over time can be a random or pseudorandom distribution.

In another aspect of some embodiments, the reported CQI value is selected by determining which of a plurality of candidate CQI values will cause the user equipment to maintain as much functionality as possible while at the same time alleviating or avoiding the user equipment overload condition.

In yet another aspect of some embodiments, the user equipment overload condition is an overheating condition.

In other alternatives, the overload condition can be a limitation in user equipment processing capability. This limitation can be, for example, a receiving buffer bottleneck; a transmitting buffer bottleneck; a signal processing bottleneck; or an inability to process received data blocks at an instantaneous downlink throughput rate. As used herein, the term "bottleneck" denotes a part of a path having a lower throughput rate than other parts that make up the path.

In another aspect of some embodiments, the overload condition can be an alert that an actual overload condition will exist if the user equipment continues operating in a present manner of operation. In these embodiments, the user equipment is able to take actions to avoid the actual occurrence of the overload condition.

In yet other embodiments, methods and apparatuses operate a user equipment in a mobile communications system. Such operation includes operating a receiver of the user equipment to receive one or more data blocks via a channel. A user equipment overload condition is detected. In response to the detected user equipment overload condition, a signal is sent to a serving base station, wherein the signal is a request for the serving base station to reduce a downlink data throughput rate, and wherein the signal comprises a first field for indicating whether a downlink data throughput rate reduction is being requested, and a second field that indicates how the serving base station should respond when the downlink data throughput rate reduction is being requested.

In some embodiments, the second field is a channel quality indicator (CQI) field when the downlink data throughput rate reduction is not being requested.

In some embodiments, the second field indicates by how much the downlink data throughput rate should be reduced. The second field can alternatively indicate a maximum data rate value that the user equipment is able to handle.

BRIEF DESCRIPTION OF THE DRAWINGS

The objects and advantages of the invention will be understood by reading the following detailed description in conjunction with the drawings in which.

DETAILED DESCRIPTION

Figure 1:
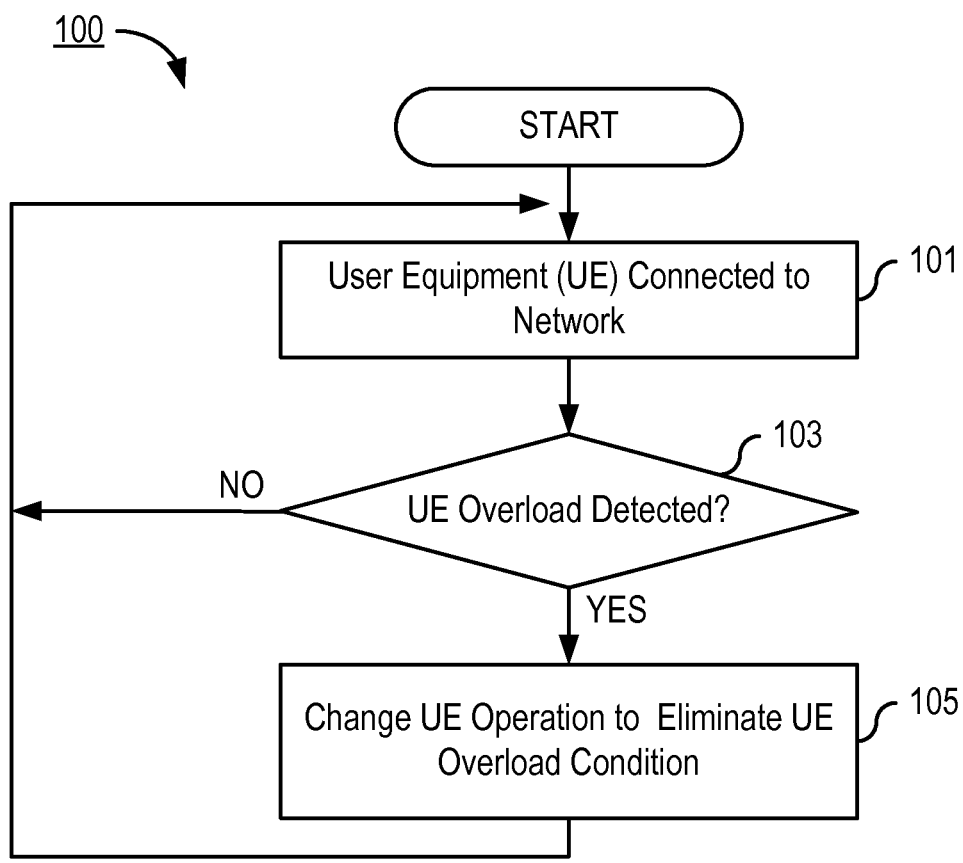
FIG. 1 is a flowchart of exemplary steps/processes carried out by suitably adapted logic in a user equipment in accordance with exemplary embodiments of the invention.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, "logic adapted to" perform a described action, or alternatively as "logic that" performs a described action.

In order to facilitate the description of the various aspects of embodiments consistent with the invention, the various embodiments are described in the context of an LTE system. For example, the network access point from which a user equipment obtains service is herein referred to as an "eNode-B". However, the use of LTE terminology is not intended to limit the scope of the invention. For example, references to "eNode-B" made in the description as well as in the claims should be construed to include not only eNode-B's found in LTE systems, but also to their equivalents in other systems (e.g., a node B or other base station).

In an aspect of embodiments consistent with the invention, a user equipment overload condition is detected and, in response thereto, one or more actions are taken within the user equipment to either directly or indirectly eliminate the cause of the user equipment overload condition. These and other aspects are described in greater detail in the following.

FIG. 1 is a flowchart of exemplary steps/processes carried out by suitably adapted logic 100 in a user equipment in accordance with exemplary embodiments of the invention. The user equipment operates in a connected mode with a serving network (step 101). As a result, uplink and downlink data and control information are exchanged between the user equipment and an eNode-B of the network. This exchange takes place in accordance with a cellular system protocol such as, without limitation, LTE, e-HSPA, and WiMax.

At some point in time, an overload condition is detected in the user equipment ("YES" path out of decision block 103). The overload condition can be, for example, and overheating condition. Alternatively, the overload condition can be an inability of the user equipment to process data at the rate at which it is being received. In any of these cases, the overload condition can represent an existing condition within the user equipment, or alternatively it can be an alert that an actual overload condition will exist if the user equipment continues operating in a present manner of operation.

In response to the detected overload condition, the user equipment changes its operation in a manner that results in alleviation or aversion of the overload condition. For example, the user equipment can respond to an overheating condition by taking one or more steps that, either directly or indirectly, result in the user equipment reducing its level of power consumption. In another example, the user equipment can respond to an incoming data rate that is too high by taking one or more steps that cause the serving node to reduce the rate of data transmission in the downlink direction.

Figure 2:
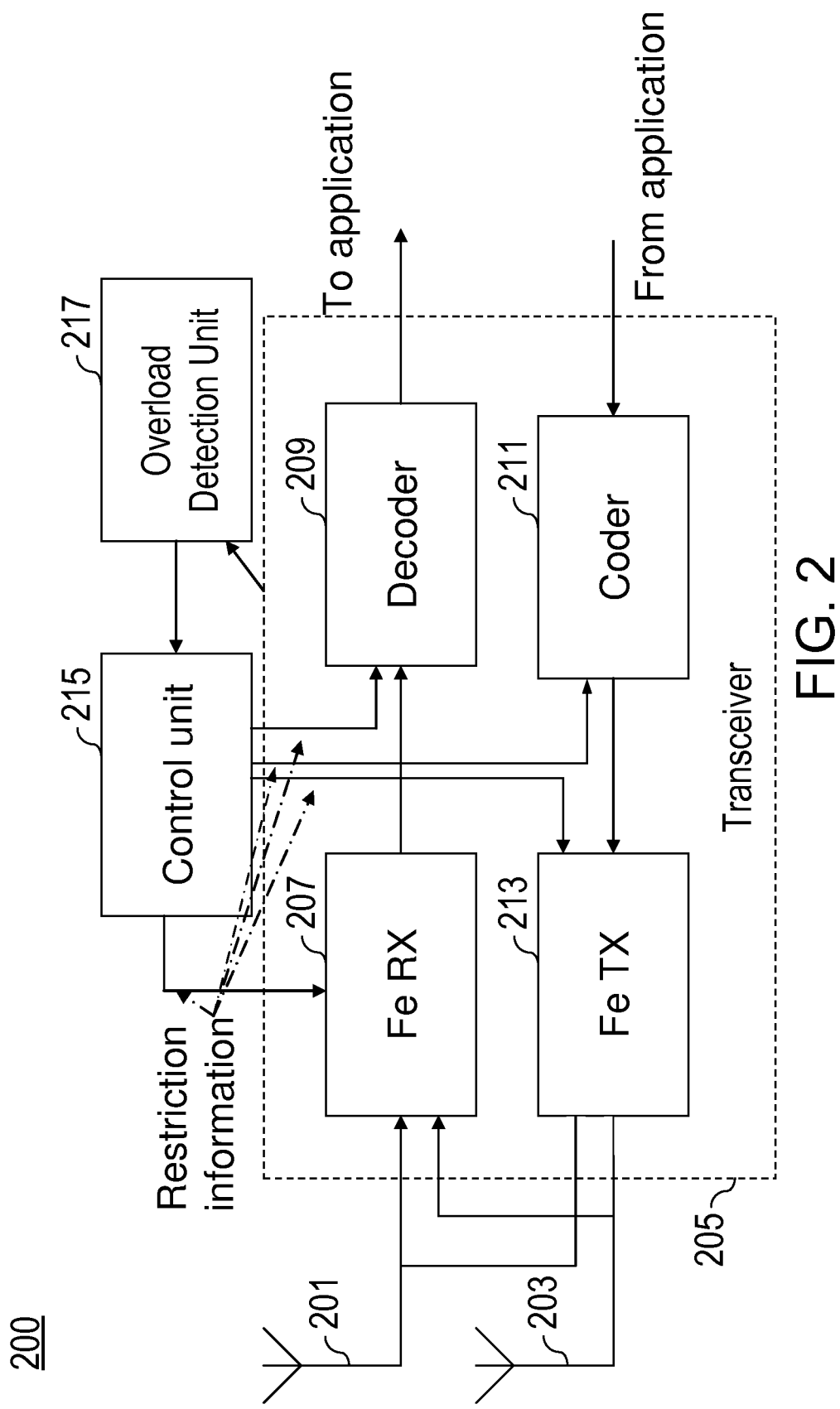
FIG. 2 is a high level block diagram of an exemplary user equipment adapted to carry out the above-described functions.

FIG. 2 is a high level block diagram of an exemplary user equipment 200 adapted to carry out the above-described functions. In this example, the user equipment 200 includes first and second antennas 201, 203 each of which is used for both transmission and reception of radio signals. Having more than one antenna allows the user equipment 200 to operate in a multiple input multiple output (MIMO) mode of operation, as is known in the art. However, this is not essential to the invention and other embodiments could involve only a single antenna or more than two antennas. Also, the number of antennas is not a determining factor of the user equipment functionality, nor does it restrict the scope of the invention. For example, due to cost limitations (e.g., the need for extra power amplifiers), it is often the case that a user equipment will be designed to operate with asymmetric receiver/transmit paths (e.g., two receive paths and only one transmit path).

Transceiver circuitry 205 in the user equipment 200 includes a receiver chain and a transmitter chain. The receiver chain comprises a front-end receiver 207 that receives radio signals from the first and second antennas 201, 203 and generates a baseband signal that is supplied to the decoder 209. The decoder 209 processes the received baseband signal and generates therefrom the data conveyed by the radio signal. This data is supplied to an application within the user equipment 200 for further processing. The nature of that further processing is beyond the scope of the invention.

The transmitter chain comprises a coder 211 and a front-end transmitter 213. Operation of the transmitter chain is essentially the reverse of that of the receiver chain. The coder 211 receives data from an application running within the user equipment 200 and formats the data in a manner that makes it suitable for transmission (e.g., by applying forward error correction coding and interleaving). The coded data, residing on a baseband signal, is supplied to the front-end transmitter 213 which converts the baseband signal into a modulated radiofrequency signal. The power of the modulated radiofrequency is set to a desired level and supplied to the first and second antennas 201, 203 for transmission. (In embodiments utilizing only one transmit path, the output signal is supplied to only a single one of the first and second antennas 201, 203.) Although, not illustrated in the figure, it will be understood that the user equipment 200 includes circuitry to ensure that signals to be transmitted do not appear on the input terminals of the front-end receiver 207.

The various blocks within the transceiver 205 operate in accordance with control signals that are generated by a control unit 215. In order to operate as described with reference to FIG. 1, the user equipment 200 also includes an overload detection unit 217 that monitors one or more conditions within the transceiver 205 and determines whether these conditions constitute an overload condition. The results of this determination are supplied to the control unit 215 which can then take appropriate actions. For example, as described above, if an overheating condition has been detected the control unit 215 can take one or more steps to alleviate this condition, such as by limiting the maximum transmit power or reducing the speed at which received data is processed or reducing the data rate of data to be transmitted. These actions are described in greater detail in the following discussion.

Consider first an overheating condition within the user equipment. Changing the user equipment operation to eliminate the overheating condition can involve any one or a combination of the following actions. Overheating can be addressed by lowering the level of power consumption within the user equipment and this can be accomplished in a variety of ways. One technique involves reducing the amount of power consumed by a transmitter part of the user equipment circuitry. For example, the maximum allowed transmitter power (typically 24 dBm maximum transmitter power in an LTE or e-HSPA system) of the user equipment's transmitter can be restricted. Reduction of the maximum allowed transmitter power results in a typically significant lower power consumption in the transmitter part but this in turn reduces the maximum possible uplink data throughput rate. In some embodiments, it is advantageous to inform the eNode-B that the user equipment will be using a reduced transmit power level, so that the network can take this into consideration when scheduling uplink allocation (i.e., because reduced transmit power means that data rates will be reduced).

Another way to reduce the power consumption, and thereby reduce the temperature in the user equipment, is to disable one or more transmitters when the user equipment includes more than one. This leaves only a subset of the user equipment's transmitters enabled, and these are used to maintain a connection with the network.

The temperature within the user equipment can also be reduced by decreasing the power consumed by the receiver circuitry of the user equipment. A direct way of doing this is to disable one or more receiver chains, leaving only a subset of the receivers powered on in order to maintain a connection with the network.

Another way to do this is to reduce the clock rate that governs the decoder process. Since the power consumption in the baseband is proportional to the clock rate, a lower level of power consumption will be achieved. However, this also results in a lower level of maximum downlink data throughput.

Yet another technique for restricting the power consumed by the user equipment, and thereby reduce the temperature within the user equipment, is to restrict the downlink data rate. Because a significant part of the baseband power consumption is proportional to the data rate, a reduced data rate results in lower power consumption. Since the serving node is responsible for setting the downlink data throughput rate, it is necessary for the user equipment take some action that will cause the serving node to make the desired data rate adjustments.

Figure 3:
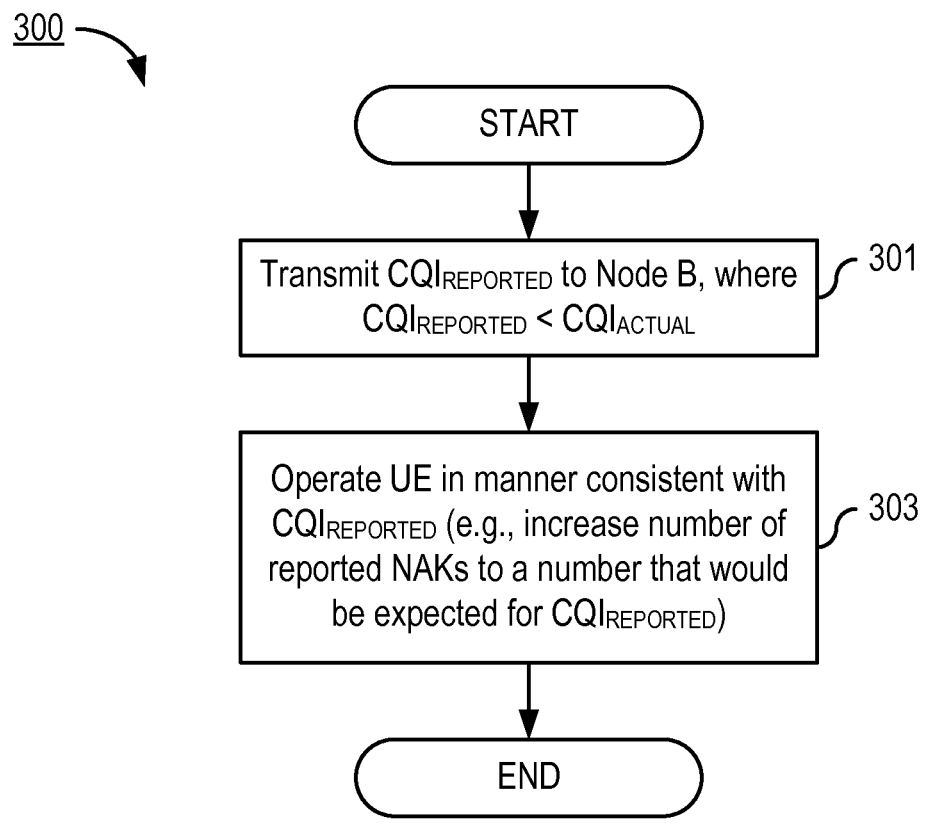
FIG. 3 is a flowchart of exemplary steps/processes carried out by suitably adapted logic in a user equipment in accordance with exemplary embodiments of the invention that indirectly bring about the serving node reducing a downlink data throughput rate.

In some embodiments, this can be accomplished by directly signaling the need for a lower data throughput rate to the serving node. Typically, however, permissible signaling is governed by the published standards for the given system type. In the event that the applicable standard does not provide a mechanism whereby the user equipment can directly request a lower downlink data throughput rate, it is still possible for the user equipment to bring about this result. FIG. 3 is a flowchart of exemplary steps/processes carried out by suitably adapted logic 300 in a user equipment in accordance with exemplary embodiments of the invention that indirectly bring about the serving node reducing a downlink data throughput rate. In one aspect of this exemplary embodiment, the user equipment sends a channel quality indicator (CQI) report to the eNode-B (or equivalent), wherein the reported value ($CQI_{REPORTED}$) is intentionally set to a value that indicates a lower quality channel then actually exists (i.e., the true channel quality value should be set to $CQI_{ACTUAL}$) (step 301). The theory on which this action is based is as follows: The CQI value is typically derived from the instantaneous signal-to-interference ratio (SIR) of the received signal. The value $CQI_{ACTUAL}$ is associated with the highest possible throughput rate for the SIR of the received signal. A lower CQI value indicates to the eNode-B that the SIR is lower. As a result, the eNode-B will respond by increasing the level of coding that is applied to the transmitted information. The more coding is applied, the lower the downlink throughput rate.

In some embodiments, this might be all that is required: By reducing the CQI value, the network will typically respond by introducing more coding into the transmitted bits, thereby reducing the downlink throughput.

In some other embodiments, however, the network tests the validity of the reported CQI value. For example, the worse the channel is, the more errors one would expect to occur as blocks of data are transmitted from the serving node to the user equipment at a given code rate. At the serving node, this can be measured by, for example, measuring the number of negative acknowledgments (NAKs) that are received during a given period of time. As is well-known, a NAK is sent by a receiver of a data block back to the sender to indicate that the block was received with errors and should be re-sent. Accordingly, a serving node can measure the rate at which NAKs are received from the user equipment and can compare this with what would be expected when the CQI is as reported by the user equipment. For example, a typical block error rate that a system would expect to achieve is 10%. But if the network reduces the downlink throughput data rate in response to its "belief" that the $CQI_{REPORTED}$ value accurately represents the channel quality, which is actually better than reported, the actual NAK rate will likely be lower than expected. If the NAK rate is less then what would be expected for $CQI_{REPORTED}$, then the network could assume that $CQI_{REPORTED}$ is inaccurate and maintain (or return to) the (pre-)existing downlink throughput rate.

To prevent this from happening in such embodiments, the user equipment should be operated in a manner that is consistent with the reported CQI value (step 303). For example, the user equipment should send NAKs to the serving node at a rate that is consistent with a channel whose quality corresponds to the reported CQI value. This will likely mean sending one or more NAKs for blocks of data whose reception was acceptable (i.e., received without errors or received with correctable errors).

In some embodiments, even this may be insufficient to "convince" the network that the channel between the serving node and the user equipment really is as poor as reported by the user equipment. In such cases, additional steps would be required. For example, for a given channel quality the network may expect not only that a certain number of NAKs will be received during a given period of time, but that these NAKs will be distributed in an expected way over that time period. Accordingly, the user equipment in such embodiments should not only send NAKs at a rate that corresponds to the reported CQI value, but should also ensure that the distribution of these NAKs over time matches an expected distribution for the reported CQI value. For example, the distribution of NAKs can be made to be random or pseudorandom.

Given that reporting a lower CQI value will cause the network to lower its downlink throughput rate, the user equipment is faced with the question of exactly what value to report. In some embodiments, this can be dealt with by, for a given set of reportable values, choosing a value that is just less than what the actual CQI value would be. Alternatively, a user equipment could always report a lowest possible CQI value when it wishes to reduce the downlink throughput rate. However, in many embodiments it is advantageous to select a CQI value by determining which of a plurality of candidate CQI values will cause the user equipment to maintain as much functionality as possible while at the same time extinguishing the user equipment overload condition.

In selecting a suitable CQI value to be reported, the following factors should be considered: In exemplary embodiments, (e.g., LTE and HSPA), each CQI incremental step represents an increment of 1 dB. A report of CQI=0 typically represents the worst channel quality, so the eNode-B may respond to such a report by eliminating normal data traffic to the user equipment. (Control signaling should still be sent, however, to permit improvements to be made by, for example, handing over the connection to another eNode-B.) By reducing the CQI by a fixed number of steps (e.g., reporting a CQI value that is lower than $CQI_{ACTUAL}$ by an amount ranging from 6 to 12, which would be 6-12 dB lower than the received SIR), the downlink throughput will be reduced by 6-12 dB (a factor of 4-16), significantly reducing the risk of the user equipment experiencing the overload condition. To illustrate this by an example, suppose a user equipment experiences an overload condition when CQI=28 and the downlink throughput rate is 25 Mb/s. Reducing by a factor of 4-8 still allows a downlink throughput rate of from 2-6 Mb/s, which is still reasonably good service for the user, and is well above the Radio Resource Control (RRC) signaling needs (which are about a maximum of 100 kb/s).

Figure 4:
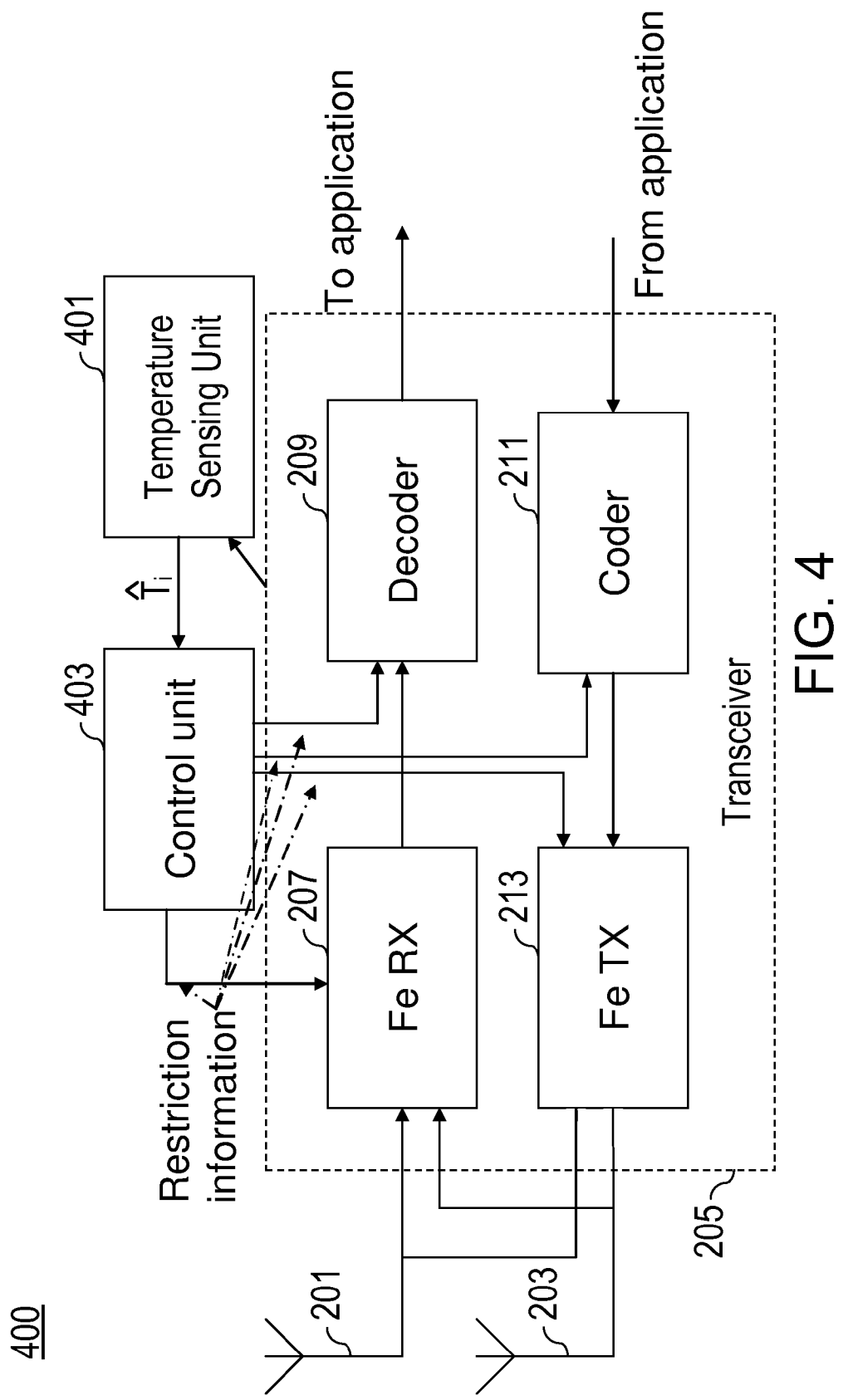
FIG. 4 is a block diagram of an exemplary user equipment that includes elements that are particularly adapted to alleviate or avoid an overheating condition within the user equipment.

FIG. 4 is a block diagram of an exemplary user equipment 400 that includes elements that are particularly adapted to alleviate or avoid an overheating condition within the user equipment 400. The user equipment 400 includes many of the same elements as those described earlier with respect to FIG. 2. Accordingly, those elements that are common to both figures need not be described again. The user equipment 400 includes a temperature sensing unit 401 that generates a signal, $\hat{T}_i$, that represents an i:th estimate (wherein i is an integer) of the temperature within the user equipment 400. This temperature signal is supplied to a control unit 403.

The control unit 403 compares the temperature estimate with a threshold value. The comparison indicates whether the user equipment 400 is in or (in some embodiments) approaching an overheating condition. In response to the detected overheating condition, the control unit 403 generates control signals to cause any one or more of the above-described overheating alleviating actions to be taken (e.g., limiting transmitter power, reducing the rate of decoding, etc.).

Figure 5:
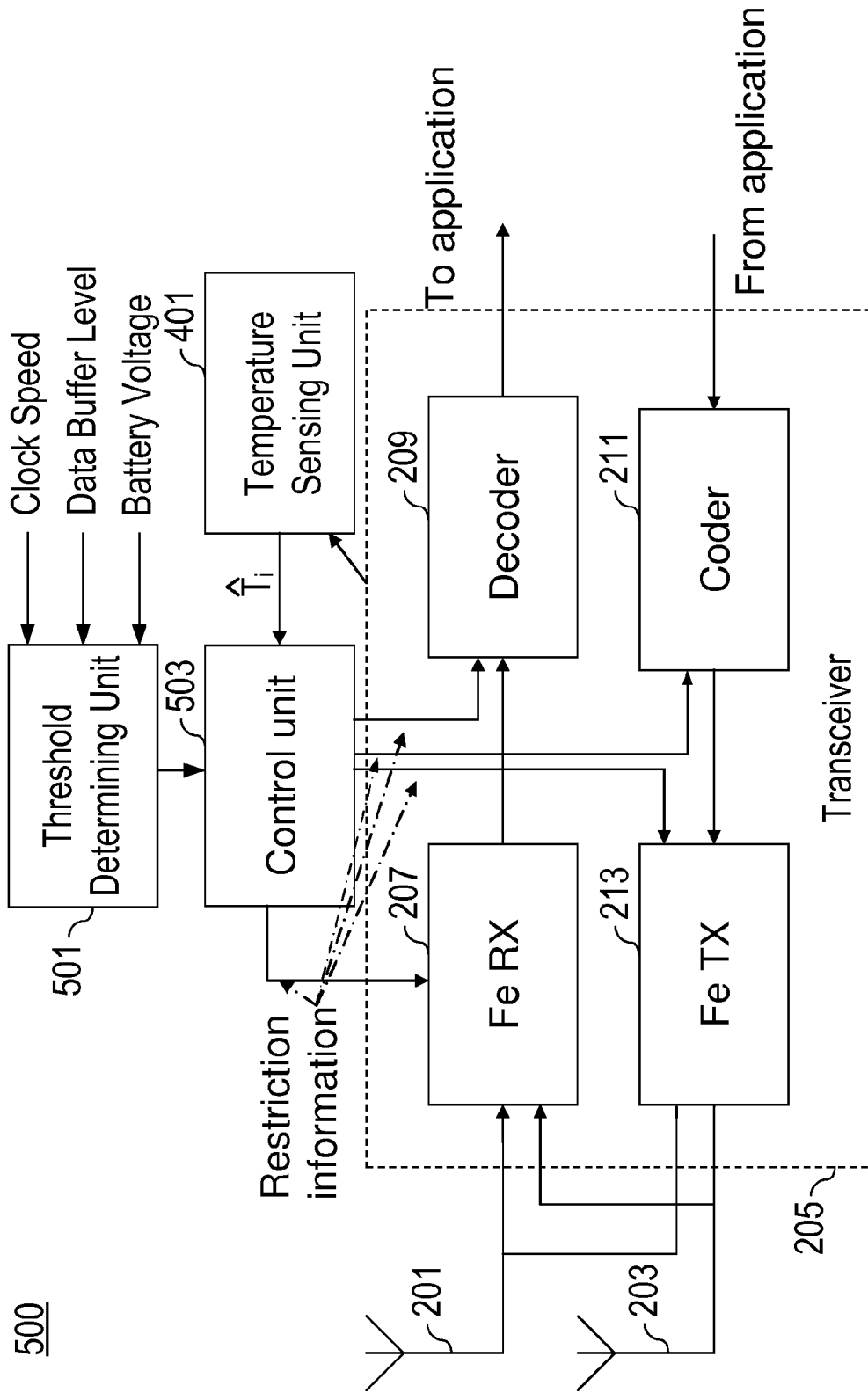
FIG. 5 is a block diagram of an alternative embodiment of an exemplary user equipment that includes elements that are particularly adapted to alleviate or avoid an overheating condition within the user equipment.

FIG. 5 is a block diagram of an alternative embodiment of an exemplary user equipment 500 that includes elements that are particularly adapted to alleviate or avoid an overheating condition within the user equipment 500. The user equipment 500 includes many of the same elements as those described above with respect to FIG. 4. Accordingly, those elements that are common to both figures need not be described again. The user equipment 500 differs from the user equipment 400 in that the threshold level against which the temperature estimate is compared is not a fixed value, but is instead determined dynamically. To perform this function, the user equipment 500 includes a threshold determining unit 501. In the illustrated embodiment, the threshold determining unit 501 determines what temperature level would constitute an overheating condition (or would indicate that the user equipment 500 is about to overheat) based upon the present battery voltage, data buffer level, and clock speed of processing units and/or buses within the user equipment 500. A strategy is adopted wherein, in order to avoid taking unnecessary actions, a higher threshold value is used for transient effects (e.g., transmission bursts) and/or when a temperature rise is predictable and slow (e.g., ongoing battery use). By contrast, in order to ensure that action is taken before overheating becomes a serious problem, a lower threshold value is used when the heating activity is less transient (e.g., predictable moderate to quick heating resulting from a long term process) and/or when a temperature rise is relatively unpredictable (e.g., as with high data rates and/or clock speeds).

More specifically, temperature problems can originate from different sources, each associated with its own level of predictability and rate of temperature rise. These characteristics can offer guidance about what would constitute a suitable threshold value. It is desirable to be able to take action before a temperature becomes high enough to cause damage or otherwise detrimentally impact performance. Thus, situations associated with very fast heating call for a low threshold, so that ameliorative action can be taken as soon as possible. By contrast, situations that cause slow heating can be associated with a high threshold level because quick action is not required—in these circumstances, the user equipment can be permitted to continue its higher level of performance for some time before being degraded in some manner to reduce power (and thereby reduce temperature). When the nature of the heating is unpredictable, prudence calls for a lower threshold level so that ameliorative action can be taken sooner rather than later to avoid any possible damage.

Whether a heat producing set of circumstances is long lasting or transient can also be a factor when determining a suitable threshold level. For example, if circumstances are known to be transient, a high threshold level may be acceptable even if fast heating is expected because that heating may not last long enough to do any harm.

Some examples will illustrate the various points. Consider a short burst of a high transmit power amplifier output power while data rates are low (e.g., as indicated by clock speed). Heating may be fast, but the situation is known to be transient, so a higher temperature threshold would be appropriate for such circumstances to avoid taking unnecessary action. Other temperature problems arise from conditions that persist over a longer period of time, such as very high data rates. (High data rates can cause overheating because higher data rates require a higher clock speed, which in turn consumes more power than lower clock speeds.) For these overheating problems that arise slowly over time, a lower threshold is appropriate.

Monitoring the battery level is useful because the lower the voltage, the lower the power consumption in the chip (power is proportional to the square of the supply voltage). Therefore, the lower the battery level, the longer it will take to heat up the circuitry, so the temperature threshold value can be set to a higher value.

Monitoring the data buffer level is useful because information indicating that the data buffer is full implies that there is a high risk that the situation for overheating (due to high processing load) will continue for some time, whereas an indication of low data buffer utilization implies that the processing load (and hence temperature) will likely go down soon (i.e., when the buffer is empty). The former situation calls for a lower threshold value if heating occurs quickly, whereas the latter calls for a higher threshold value in order to avoid taking unnecessary action to address a situation that will soon fix itself.

The threshold value generated by the threshold determining unit 501 is then supplied to a control unit 503.

The control unit 503 then compares the temperature estimate with the dynamically determined threshold value. As in the earlier-described embodiment, the comparison indicates whether the user equipment 500 is in or (in some embodiments) approaching an overheating condition. In response to the detected overheating condition, the control unit 503 generates control signals to cause any one or more of the above-described overheating alleviating actions to be taken (e.g., limiting transmitter power, reducing the rate of decoding, etc.).

The discussion will now turn to embodiments in which the overload condition is an inability of the user equipment to handle data at the rate at which it is being provided in the downlink direction. As mentioned earlier, this can be attributable to a number of different causes, including but not limited to a receiver buffer overflow or a downlink data rate that exceeds the user equipment's signal processing power.

Figure 6:
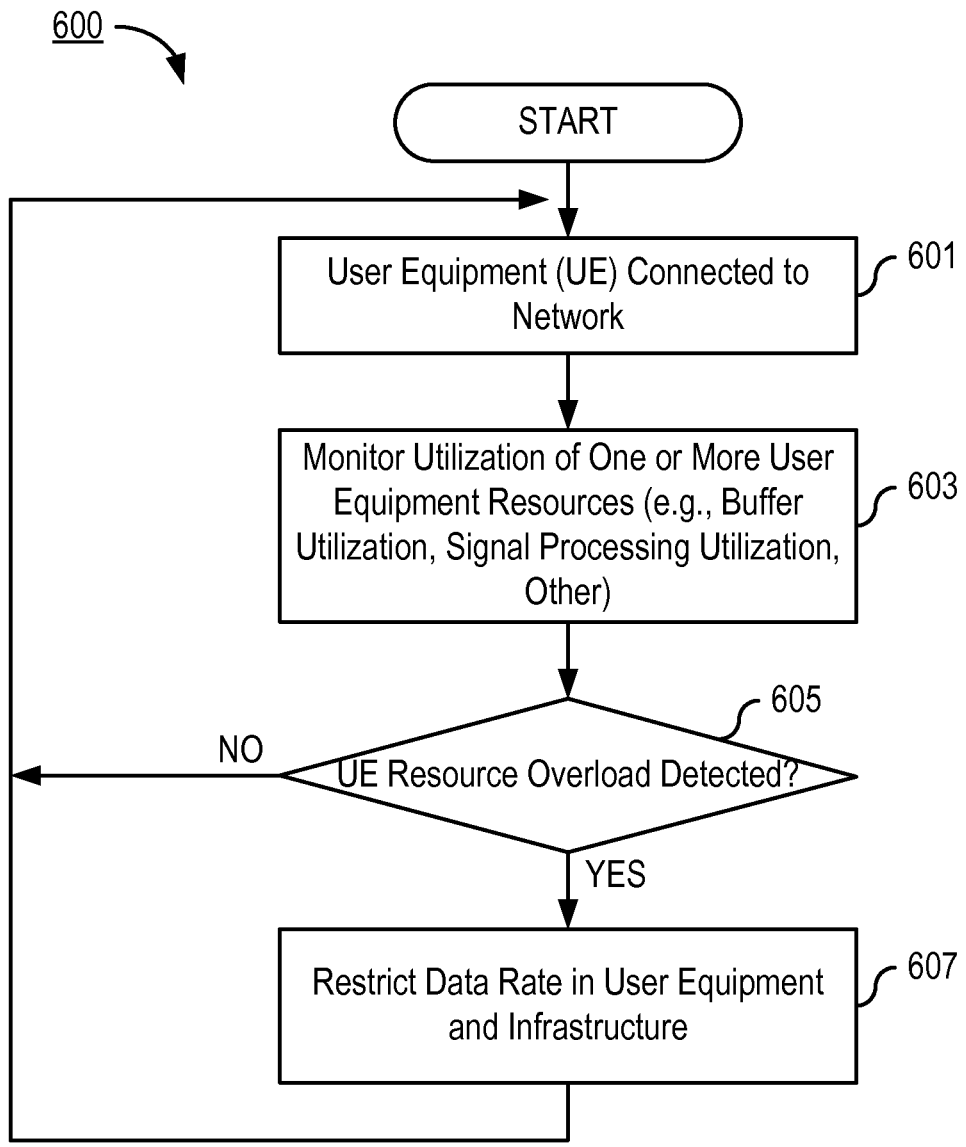
FIG. 6 is a flowchart of exemplary steps/processes carried out by suitably adapted logic in a user equipment in accordance with exemplary alternative embodiments of the invention.

FIG. 6 is a flowchart of exemplary steps/processes carried out by suitably adapted logic 600 in a user equipment in accordance with exemplary embodiments of the invention. The user equipment operates in a connected mode with a serving network (step 601). As a result, uplink and downlink data and control information are exchanged between the user equipment and an eNode-B (or equivalent). This exchange takes place in accordance with a cellular system protocol such as, without limitation, LTE, e-HSPA, and WiMax.

While connected to the network, the user equipment monitors the utilization of one or more (depending on the particular embodiment) user equipment resources (step 603). These resources include, but are not limited to, receive buffer utilization, and signal processing utilization.

So long as no resource overload is detected ("NO" path out of decision block 605), operation continues as just described.

However, if a resource overload is detected ("YES" path out of decision block 605), the user equipment invokes logic configured to restrict the data rate in the user equipment and network infrastructure (step 607). This involves notifying the network that it should reduce its peak data rates, either for a limited period of time or indefinitely until otherwise notified, depending on embodiment.

In some embodiments, the user equipment signals the network to inform of the user equipment's limited processing capability. The signaling can take the form of a short message that indicates, for example, the limitation cause, the receive buffer status, the current maximum possible data rate, the duration of the limitation and other supporting information. In order to limit the size of such signaling, in some embodiments there exists a preconfigured set of messages either per user equipment or per system that allows the user equipment to signal by means of only a message identifier. The preconfigured set of messages is known to both the network and the user equipment. The message identifier is associated with the intended one of the preconfigured set of messages, so that merely communicating the message identifier is sufficient to inform the network of the content of the intended message. The simplest predefined message can be one that requests an immediate halt of downlink transmission for a specific time.

Figure 7:
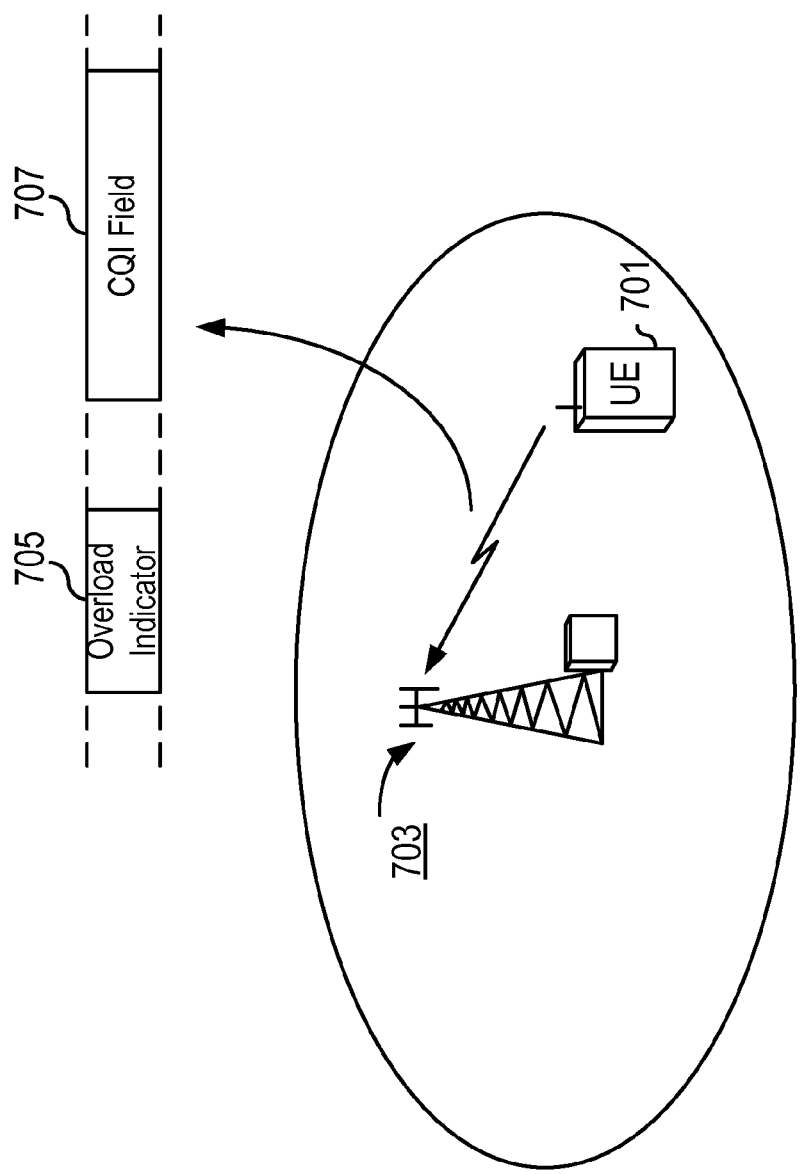
FIG. 7 is a block diagram of an exemplary user equipment being served by an eNode-B, and exemplary signaling from the user equipment to indicate an overload condition.

In some embodiments, a 1-bit indicator can be defined for signaling to the network that the user equipment would like the downlink data throughput rate to be reduced. In some embodiments, other fields can be used in conjunction with the 1-bit indicator to provide additional information. For example, when the 1-bit indicator is asserted, an existing field such as the CQI indicator can be used to indicate by how much the downlink data throughput rate should be reduced (i.e., the CQI indicator field indicates how the serving eNode-B should respond when the downlink data throughput rate reduction is being requested, and otherwise continues to represent the CQI). Alternatively, this second field (e.g., the CQI field) can, when the 1-bit indicator is asserted, represent the maximum value of the data rate that the user equipment is still able to handle. FIG. 7 is a block diagram of an exemplary user equipment 701 being served by an eNode-B 703. In this illustration, the user equipment 701 is in the process of signaling to the eNode-B 703 that it would like the downlink data throughput rate to be reduced. The exemplary signaling takes the form of a field 705 (e.g., a 1-bit field) that, when asserted, indicates the need for a data throughput rate reduction. When the data in the field 705 is asserted, another transmitted field (e.g., the CQI field 707) is interpreted by the eNode-B 703 as an indication of by how much the downlink data throughput rate should be reduced, or alternatively the maximum value of the data rate that the user equipment is still able to handle.

In response to the signal from the user equipment (regardless of the form of the signal), the network responds by adjusting the downlink throughput rate in a manner consistent with the particular message received.

As mentioned above with respect to other embodiments, permissible signaling within a mobile communications network is typically governed by the published standard for the given system type. In the event that the standards do not provide a mechanism whereby the user equipment can directly request a lower downlink data throughput rate, it is still possible for the user equipment to bring about this result. In particular, the logic 300 and steps/processes described earlier with reference to FIG. 3 are suitable for indirectly bringing about the result that the network will reduce its downlink throughput rate. (As used herein, the term "indirect" means that the user equipment takes one or more actions that, within the communications standard under which the user equipment is operating, do not directly indicate to the network that the user equipment is experiencing some sort of overload condition; nonetheless, the action(s) taken by the user equipment result(s) in the network reducing the downlink throughput rate.) It will be recalled that the technique described with reference to FIG. 3 involves the user equipment sending a CQI report to the eNode-B (or equivalent), wherein the reported value ($CQI_{REPORTED}$) is intentionally set to a value that indicates a lower quality channel then actually exists (i.e., the true channel quality value should be set to $CQI_{ACTUAL}$) (step 301).

Then, if required to "convince" the network that the reported CQI value represents actual channel conditions, the user equipment should be operated in a manner that is consistent with the reported CQI value (step 303). For example, the user equipment should send NAKs to the serving node at a rate (and possibly also a distribution over time) that is consistent with a channel whose quality corresponds to the reported CQI value. This will likely mean sending one or more NAKs for blocks of data whose reception was acceptable (i.e., received without errors or received with correctable errors).

Given that reporting a lower CQI value will cause the network to lower its downlink throughput rate, the user equipment is faced with the question of exactly what value to report. In some embodiments, this can be dealt with by, for a given set of reportable values, choosing a value that is just less than what the actual CQI value would be. Alternatively, a user equipment could always report a lowest possible CQI value when it wishes to reduce the downlink throughput rate. However, in many embodiments it is advantageous to select a CQI value by determining which of a plurality of candidate CQI values will cause the user equipment to maintain as much functionality as possible while at the same time extinguishing the user equipment overload condition.

In alternative embodiments, the user equipment indirectly brings about the network reducing the downlink throughput data rate by reporting NAKs instead of positive acknowledgements (ACKs) for some data blocks whose reception was acceptable. For those data blocks that are misleadingly reported as "not received", the user equipment can either discard the originally received data block and rely on the retransmitted version, or keep the originally transmitted version and discard the retransmitted version. This technique allows the user equipment to regulate the received data rate. However, this technique has a disadvantage in that the network continues to send data at the high data rate, thereby needlessly occupying the air interface.

Figure 8:
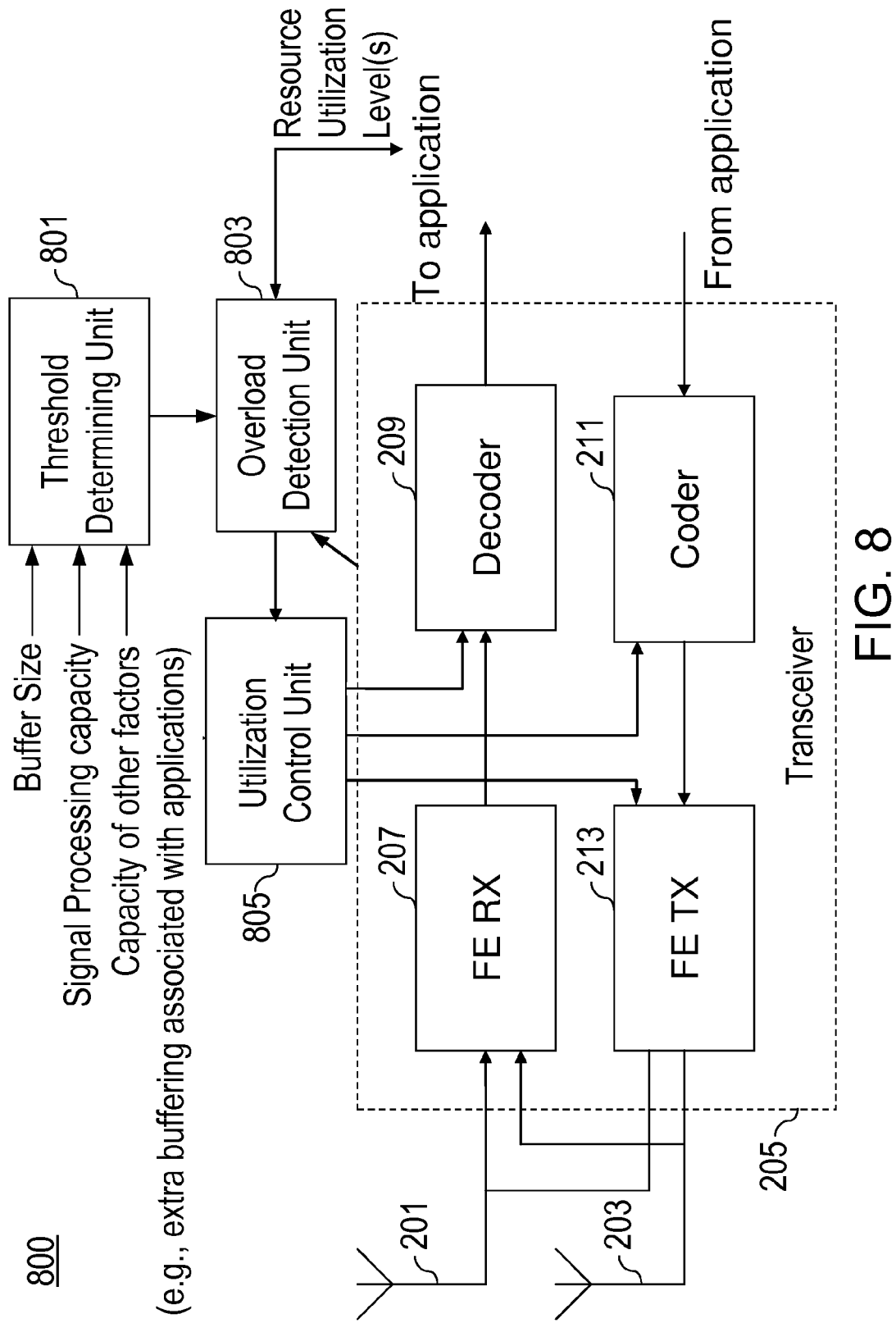
FIG. 8 is a block diagram of an exemplary user equipment that includes elements that are particularly adapted to alleviate or avoid a resource utilization overload condition within the user equipment.

FIG. 8 is a block diagram of an exemplary user equipment 800 that includes elements that are particularly adapted to alleviate or avoid a resource utilization overload condition within the user equipment 800. The user equipment 800 includes many of the same elements as those described earlier with respect to FIG. 2. Accordingly, those elements that are common to both figures need not be described again. The user equipment 800 includes additional elements that are adapted to carry out the steps/processes illustrated in FIG. 6. These include a threshold determining unit 801 that receives one or more configuration signals that indicate what resources are available within the user equipment. This information can indicate such things as buffer size, signal processing capacity, or any other resource within the user equipment that has the potential to be overloaded by an excessive downlink throughput rate. The threshold determining unit 801 generates from this information one or more threshold values that represent a level of resource utilization that corresponds to the user equipment 800 being in (or alternatively about to enter) a resource utilization overload.

The one or more threshold levels are supplied to an overload detection unit 803 that monitors one or more conditions within the transceiver 205 and also from one or more signals that indicate present utilization levels of one or more resources associated with one or more applications, and determines from these (by means of comparison with corresponding ones of the one or more threshold levels) whether existing conditions constitute (or will constitute) an overload condition. The overload detection unit 803 generates an overload status signal that is supplied to a utilization control unit 805. If the overload status signal is asserted (meaning that an overload condition has or will occur), the utilization control unit 805 generates control signals that cause the user equipment to take steps to alleviate (or prevent) the overload condition, such as those described above with reference to FIG. 6. Control lines to the decoder 209 and 211 enable the utilization control unit 805 to control the respective decoding and coding rates, as appropriate. For example, some user equipment resources that are used by both uplink and downlink processing (e.g., buffer and processing unit) can benefit from considering the operation of both reception and transmission paths together. A control line to the front-end transmitter 213 enables the output transmitter power to be adjusted, as needed.

The invention provides a number of ways that enable a user equipment to alleviate or avoid a number of different types of overload conditions. Where that overload can be alleviated by reducing the downlink data throughput rate, a number of embodiments enable this to be achieved even when a system does not provide a direct mechanism for the user equipment to request the desired data rate reduction.

The invention has been described with reference to particular embodiments. However, it will be readily apparent to those skilled in the art that it is possible to embody the invention in specific forms other than those of the embodiment described above.

For example, separate embodiments have been described in which, in some, temperature overload conditions are addressed, and in others, processing overload conditions are addressed. However, in yet other alternatives, a user equipment comprises elements that enable both issues to be dealt with. For example, some embodiments would include the equivalent of the temperature sensing unit 401 and the threshold determining unit (both depicted in FIG. 5) as well as the equivalent of the threshold determining unit (depicted in FIG. 8). In such embodiments, control logic can perform all of the functions attributed to the control unit 503 and the utilization control unit 805 described above.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment in a mobile communications system, the method comprising:
   operating a receiver of the user equipment to receive one or more data blocks via a channel;
   detecting a user equipment overload condition;
   in response to the detected user equipment overload condition, sending a signal to a serving base station, wherein the signal is a request for the serving base station to reduce a downlink data throughput rate, and wherein the signal comprises a first field for indicating whether a downlink data throughput rate reduction is being requested, and a second field that indicates how the serving base station should respond when the downlink data throughput rate reduction is being requested.

2. The method of claim 1, wherein the second field is a channel quality indicator (CQI) field when the downlink data throughput rate reduction is not being requested.

3. The method of claim 1, wherein the second field indicates by how much the downlink data throughput rate should be reduced.

4. The method of claim 1, wherein the second field indicates a maximum data rate value that the user equipment is able to handle.

5. An apparatus for operating a user equipment in a mobile communications system, the apparatus comprising:
   logic configured to operate a receiver of the user equipment to receive one or more data blocks via a channel;
   logic configured to detect a user equipment overload condition;
   logic configured to send a signal to a serving base station in response to the detected user equipment overload condition, wherein the signal is a request for the serving base station to reduce a downlink data throughput rate, and wherein the signal comprises a first field for indicating whether a downlink data throughput rate reduction is being requested, and a second field that indicates how the serving base station should respond when the downlink data throughput rate reduction is being requested.

6. The apparatus of claim 5, wherein the second field is a channel quality indicator (CQI) field when the downlink data throughput rate reduction is not being requested.

7. The apparatus of claim 5, wherein the second field indicates by how much the downlink data throughput rate should be reduced.

8. The apparatus of claim 5, wherein the second field indicates a maximum data rate value that the user equipment is able to handle.

\* \* \* \* \*